(12) United States Patent
Yin et al.

(10) Patent No.: US 7,298,613 B2
(45) Date of Patent: Nov. 20, 2007

(54) PORTABLE COMPUTER DOCKING STATION

(75) Inventors: Memphis-Zhihong Yin, Tomball, TX (US); Paul J. Doczy, Cypress, TX (US); Stacy L. Wolff, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 35 days.

(21) Appl. No.: 10/948,447

(22) Filed: Sep. 23, 2004

(65) Prior Publication Data

US 2006/0061961 A1    Mar. 23, 2006

(51) Int. Cl.
*G06F 1/16* (2006.01)
(52) U.S. Cl. .................................. 361/686
(58) Field of Classification Search ............ 361/679, 361/683, 686, 687
See application file for complete search history.

(56) References Cited

U.S. PATENT DOCUMENTS

| | | | |
|---|---|---|---|
| 5,627,450 A | 5/1997 | Ryan et al. | |
| 5,859,762 A * | 1/1999 | Clark et al. | 361/686 |
| 6,076,787 A | 6/2000 | Troyer | |
| 6,185,094 B1 | 2/2001 | Ruch et al. | |
| 6,208,508 B1 | 3/2001 | Ruch et al. | |
| 6,256,193 B1 | 7/2001 | Janik et al. | |
| 6,480,376 B1 | 11/2002 | Nguyen et al. | |
| 6,583,985 B2 | 6/2003 | Nguyen et al. | |
| 2003/0103328 A1 | 6/2003 | Hillis et al. | |
| 2005/0057893 A1* | 3/2005 | Homer et al. | 361/683 |
| 2005/0057896 A1* | 3/2005 | Homer | 361/686 |

* cited by examiner

*Primary Examiner*—Yean-Hsi Chang

(57) ABSTRACT

A portable computer docking station comprising a base and a panel rotatably connected to the base. An angle is formed between the base and the panel. A mounting point is disposed on the panel and provides a releasable connection to an interface assembly that is operable to releasably connect to a portable computer. An adjusting system controls the angle of the panel relative to the base.

22 Claims, 4 Drawing Sheets

PORTABLE COMPUTER DOCKING STATION

BACKGROUND

Portable computers are compact, lightweight computing devices and may comprise any portable electronic device, for example, notebook computers, personal digital assistants, tablet personal computers, and laptop computers. Although designed for portability and mobile uses, many people use portable computers in desktop environments. The use of portable computers in desktop environments has always created challenges with ergonomics and ease of use. Many of the features that make portable computers useful mobile tools, such as compact size and integrated components, can be limitations when used in a desktop environment.

Portable computer docking stations have been developed to ease the use of a portable computer in a desktop environment. Many of these docking stations provide interfaces with peripheral equipment, for example, input devices, networks, printers, and additional display devices, that allows the portable computer to be more easily used as a desktop system. Certain pieces of peripheral equipment, such as additional displays and input devices, enable more ergonomic use of a portable computer but are redundant to components integral to the portable computer. These redundant components not only increase hardware investment but also often occupy a large amount of desktop space.

SUMMARY

Therefore, as can be appreciated, there is a need for a portable computer docking station that enables ergonomic use of a portable computer while limiting the use of desktop space. The problems noted above are solved in large part by a portable computer docking station comprising a base and a panel rotatably connected to the base. An angle is formed between the base and the panel. A mounting point is disposed on the panel and provides a releasable connection to an interface assembly that is operable to releasably connect to a portable computer. An adjusting system controls the angle of the panel relative to the base.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or a direct electrical connection. Thus, if a first device couples to a second device, that connection may be through a direct electrical connection, or through an indirect electrical connection via other devices and connections.

DETAILED DESCRIPTION

Figure 1:
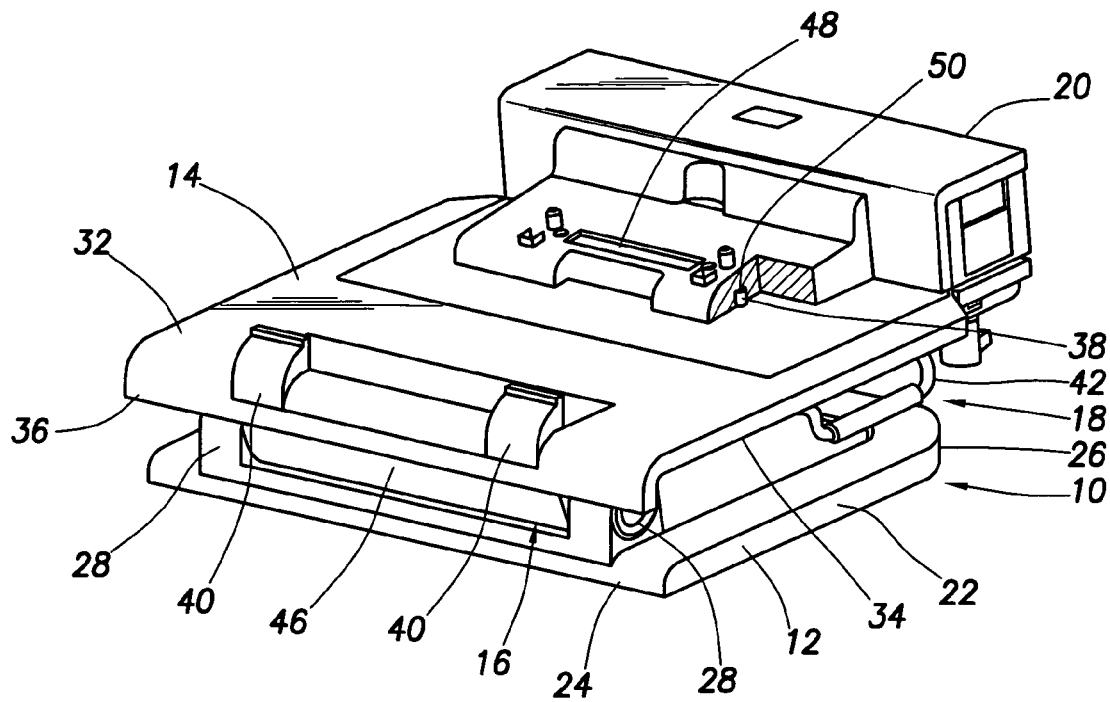
FIG. 1 illustrates a front perspective view of a portable computer docking station in accordance with embodiments of the invention.
Figure 2:
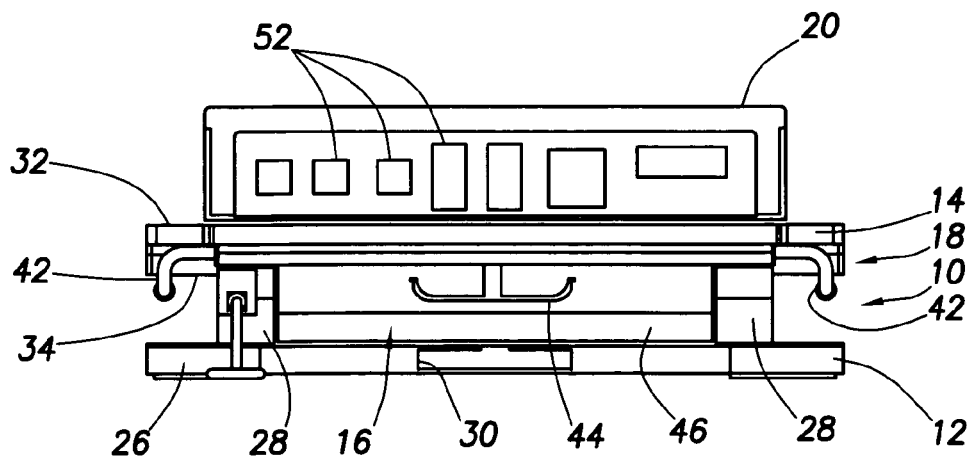
FIG. 2 illustrates a rear view of the portable computer docking station of FIG. 1.

Referring now to FIGS. 1 and 2, portable computer docking station 10 comprises base 12, panel 14, hinge 16, and adjustment system 18. Computer docking station 10 is shown with portable computer interface assembly 20 removably connected to panel 14 at mounting point 38. Base 12 comprises a substantially planar main body 22 having a front edge 24 and a rear edge 26. Front edge 24 comprises outer hinge mounts 28 that interface with hinge 16. Rear edge 26 comprises cable slot 30 that runs along body 22 towards front edge 24.

Panel 14 comprises front surface 32, rear surface 34, and lower edge 36. Panel 14 also comprises mounting points 38 that engage portable computer interface 20, and protruding shoulders 40 that support an installed portable computer (see FIG. 3). Adjustment system 18 is housed within panel 14 and can be actuated by handles 42, which are mounted on rear surface 34. Cable tray 44 is disposed on rear surface 34 and may be aligned with cable slot 30 in base 12. Lower edge 36 comprises inner hinge mount 46 that interfaces with hinge 16.

Figure 3:
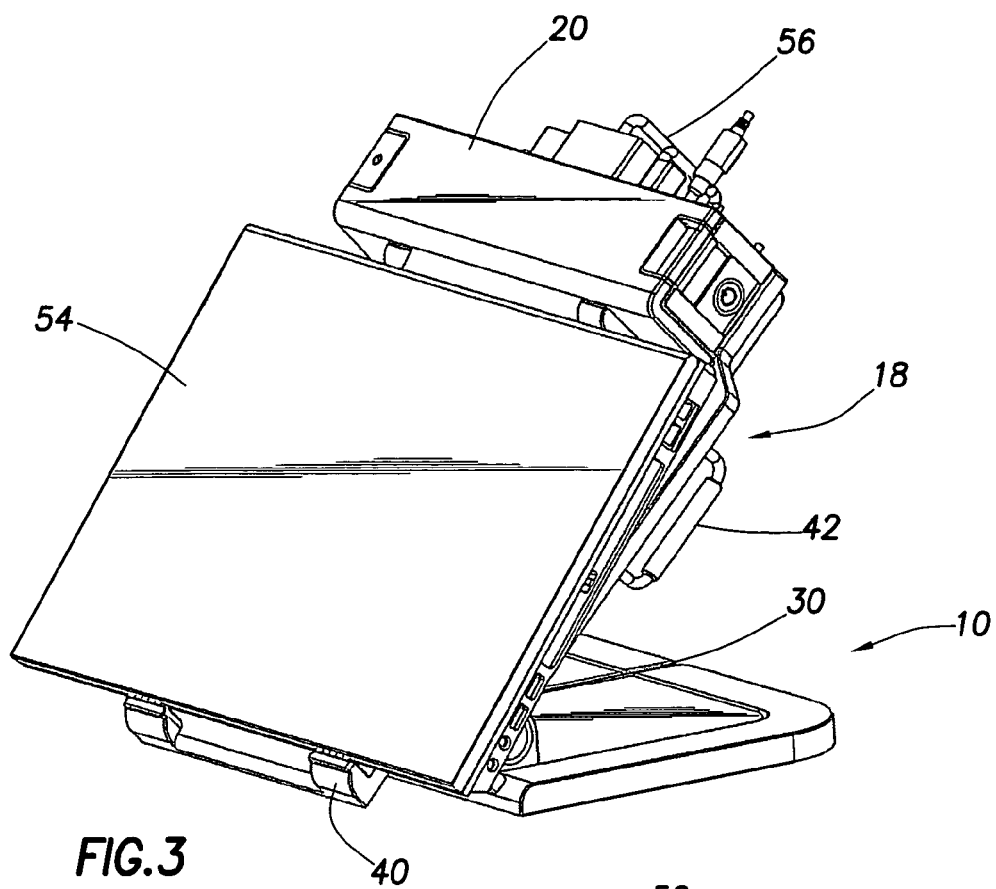
FIG. 3 illustrates a front perspective view of a portable computer installed on a portable computer docking station in accordance with embodiments of the invention.

Interface assembly 20 can be releasably connected to panel 14 and comprises an electronic interface 48 that detachably couples to a portable computer system (see FIG. 3). Assembly 20 may releasably connect to panel 14 using any effective releasable connector. Assembly 20 is shown as having slots 50 that releasably engage mounting points 38. Mounting points 38 are preferably compatible with a variety of interface assemblies allowing a single docking station to be used with more than one interface assembly.

Interface assembly 20 may be a port replicator (PR), an advanced port replicator (APR), or the like, that provides fixed attachment points for cables for network connections, peripheral equipment, and other components. Assembly 20 also comprises input/output ports 52 that provide communication between the portable computer system and peripheral systems plugged into the ports. Ports 52 may comprise serial, parallel, universal serial bus (USB), and other electronic data transfer and communication ports.

Figure 4:
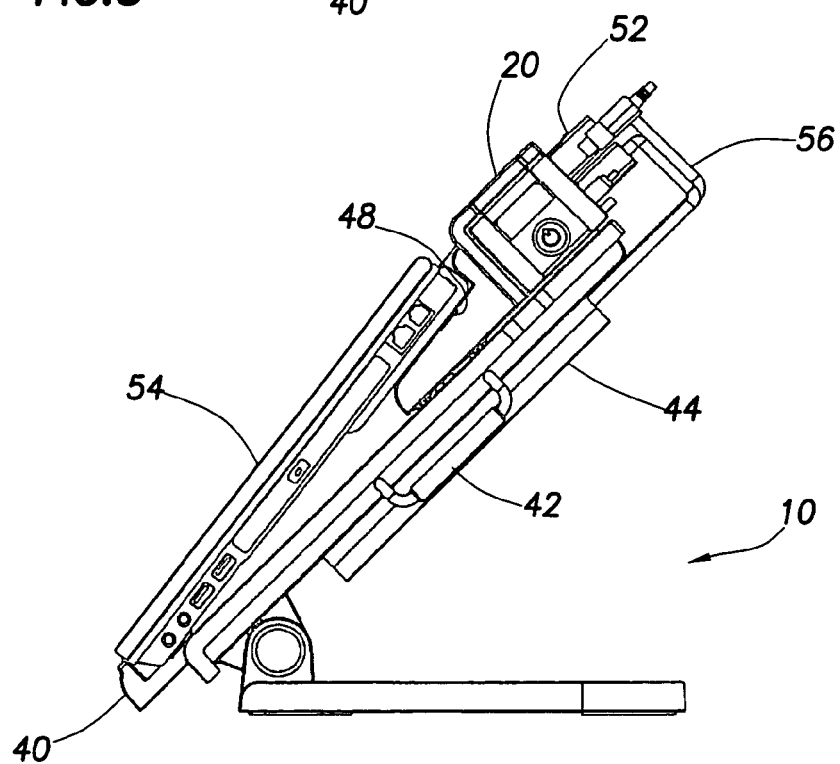
FIG. 4 illustrates a side view of a portable computer installed on a portable computer docking station in accordance with embodiments of the invention.

Referring now to FIGS. 3 and 4, portable computer 54 is shown installed on computer docking station 10. Computer 54 is coupled to interface assembly 20 by interface 48 and supported by shoulders 40 on panel 14. Connecting cables 56 can be routed through cable slot 30 and tray 44 to couple to ports 52 on assembly 20. Adjustment mechanism 18 can be actuated by pulling on one, or both, of handles 42 such that panel 14 can be rotated about hinge 16 to a desired working elevation. Although shown as configured for a notebook computer system, computer docking station 10 may also be configured for use as a docking station for a variety of portable computer systems.

Figure 5:
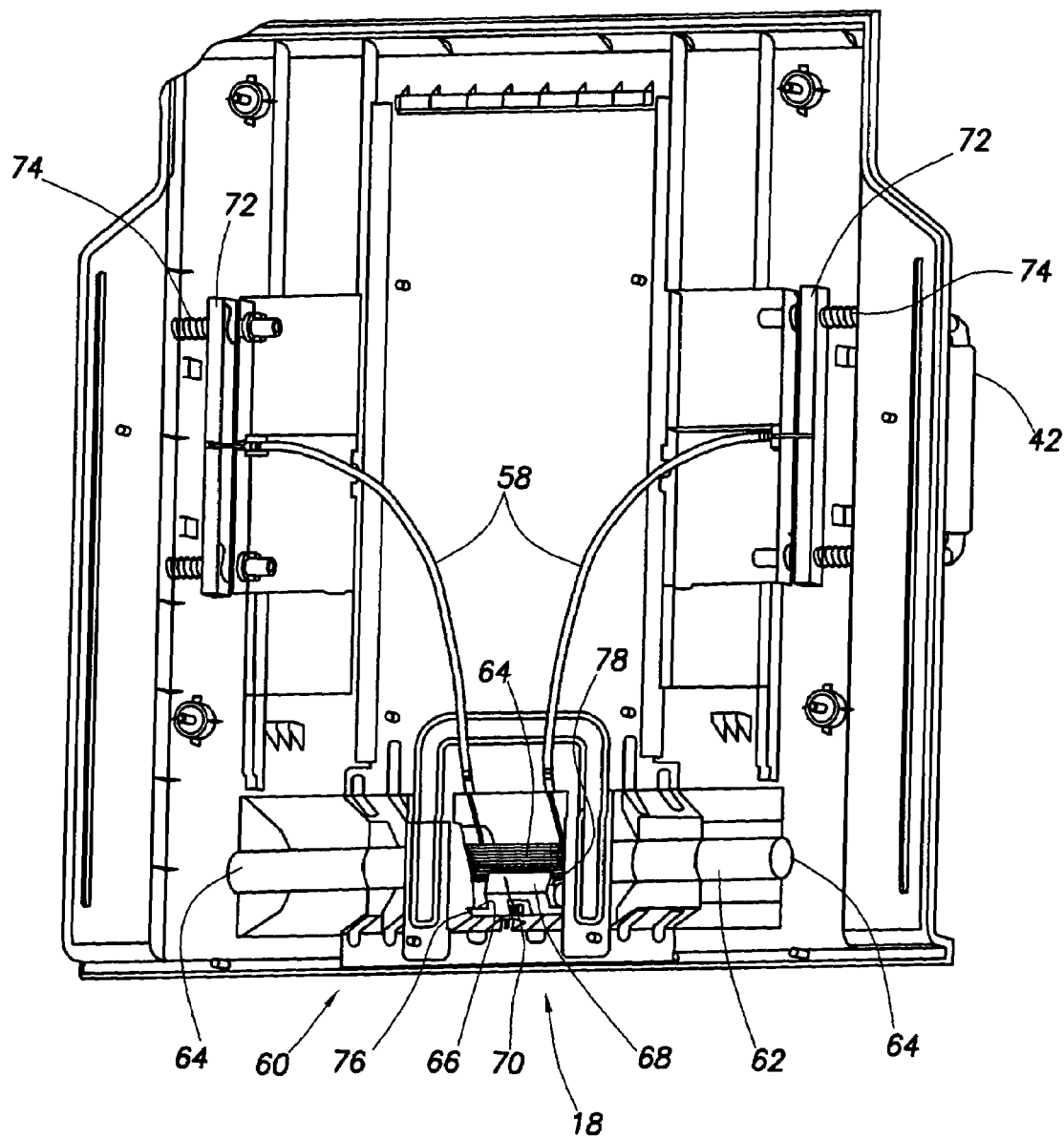
FIG. 5 illustrates an adjustment system in accordance with embodiments of the invention.

Referring now to FIG. 5, adjustment mechanism 18 is shown comprising handles 42, actuation cables 58, and latch 60. Latch 60 comprises actuation arms 66, engaging arm 68, and biasing spring 70. Handles 42 comprise cable attachment bar 72 and springs 74. Adjustment mechanism 18 is used to limit the rotation of panel 14 about hinge 16. Hinge 16 comprises shaft 62 that has ends 64 retained in outer hinge mounts 28. Shaft 62 also has splined section 64 that is aligned with latch 60.

Biasing spring 70 urges engaging arm 68 against splined section 64 by rotating latch 60 about pivot 76. Engaging arm 68 has teeth 78 that engage splined section 64 and prevent rotation of shaft 62. When one, or both, of handles 42 are pulled outward, springs 74 compress and tension is applied to actuation cables 58. Actuation cables 58 transfer this tension to actuation arms 66, which, when pulled, cause latch 60 to rotate. As latch 60 rotates, biasing spring 70 is compressed and teeth 78 disengage splined section 64, enabling panel 14 to rotate relative to shaft 62.

Panel 14 can be rotated to any desired position. Once panel 14 is positioned, handles 42 are released and adjustment system 18 maintains the position of panel 14. The release of handles 42 enables springs 74 to retract the handles and relieve tension from actuating cables 58. Without the tension from actuating cables 58, biasing spring 70 rotates latch 60 back towards its initial position and engaging arm 68 engages shaft 72. The interface between teeth 78 and splined section 64 prevents rotation of shaft 72 relative to panel 14.

Adjustment system 18 is one embodiment of a system for angular adjustment of panel 14 relative to base 12. Other one-hand and two-hand actuated systems may be used. Adjustment system 18 facilitates movement of panel 14 from substantially parallel to base 12 to an incline of between 0 and approximately 45 degrees, or more. Other ranges of inclination are also possible.

Figure 6:
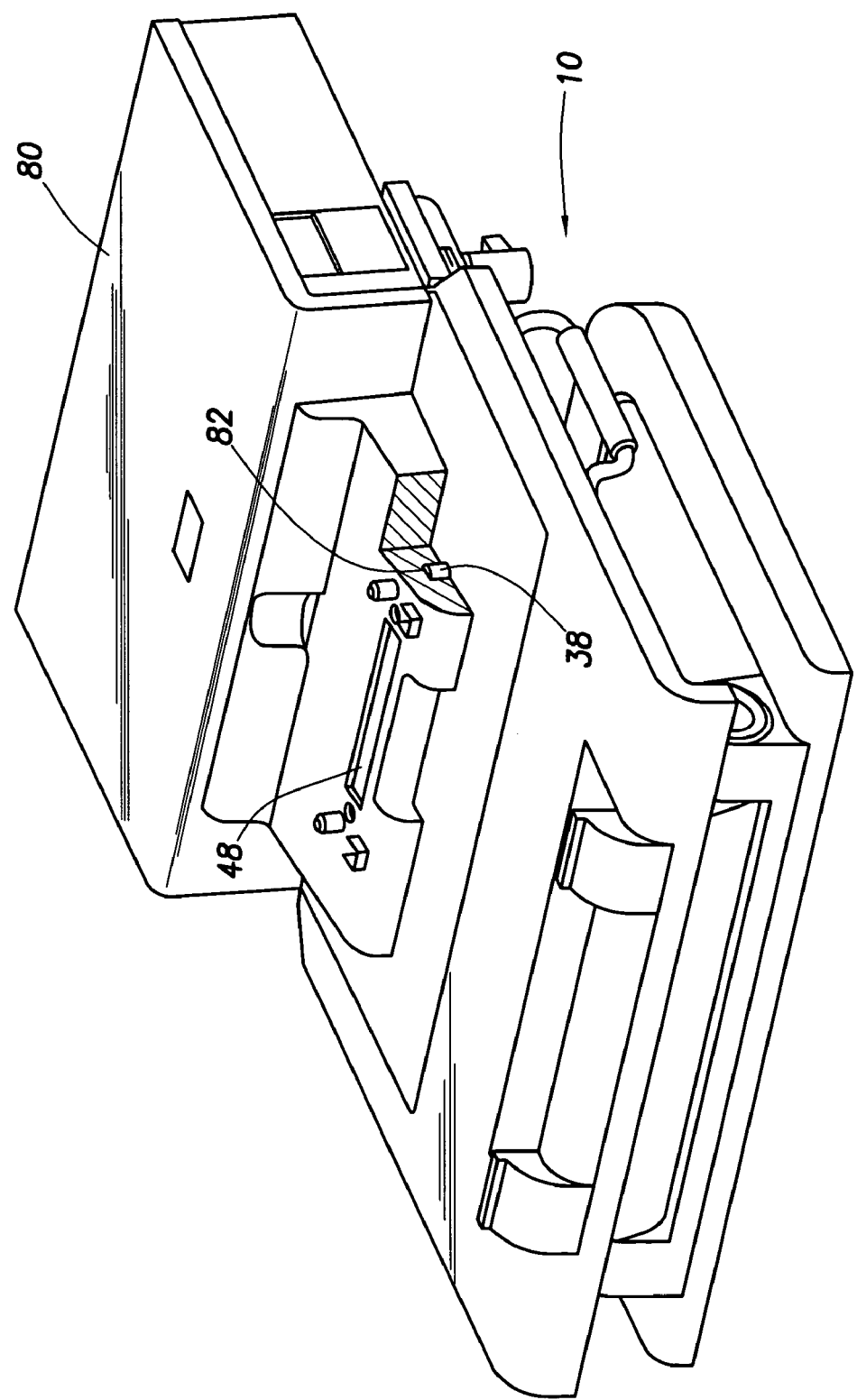
FIG. 6 illustrates a front perspective view of a portable computer docking station in accordance with embodiments of the invention.

Referring now to FIG. 6, portable computer docking station 10 is shown with an alternate computer interface assembly 80 installed. Computer interface assembly is illustrated as an advanced port replicator that provides increased functionality over the port replicator as shown in FIGS. 1 and 2. Interface assembly 80 also comprises an electronic interface 48 that couples to a portable computer. Assembly 80 may mount to panel 14 using any effective connector and is shown as having slots 82 that engage mounting points 38. In this manner, mounting points 38 can be used to support a variety docking stations, port replicators, and other interface assemblies as desired, thus providing flexibility in the use of computer docking station 10.

The above discussion is meant to be illustrative of the principles and various embodiments of the present invention. Numerous variations and modifications will become apparent to those skilled in the art once the above disclosure is fully appreciated. For example, an adjustable computer docking station may be configured for use with a variety of portable computers, for example, other types of notebook systems, notepad systems, personal digital assistants, and other equipment.

What is claimed is:

1. A portable computer docking station comprising: a base;
    a panel comprising a front surface and a rear surface, wherein said panel is rotatably connected to said base so that the rear surface faces said base and forms an angle between said base and the rear surface of said panel;
    a mounting point disposed on the front surface of said panel, wherein said mounting point provides a releasable connection to an interface assembly, wherein the interface assembly is operable to releasably connect to a portable computer; and
    an adjusting system that controls the angle of said panel relative to said base.

2. The portable computer docking station of claim 1 wherein the angle of said panel relative to said base is adjustable between substantially 0° and 45° or more.

3. The portable computer docking station of claim 1 wherein the interface assembly comprises at least one port that couples to peripheral devices.

4. The portable computer docking station of claim 1 further comprising a cable slot disposed on said base.

5. The portable computer docking station of claim 1 further comprising a cable tray disposed on said panel.

6. The portable computer docking station of claim 1 wherein said adjusting system is constructed so as to be operable with one hand.

7. A portable computer docking station comprising:
    a base;
    a panel rotatably connected to said base so as to form an angle between said base and said panel;
    a mounting point disposed on said panel, wherein said mounting point provides a releasable connection to an interface assembly, wherein the interface assembly is operable to releasably connect to a portable computer; and
    an adjusting system that controls the angle of said panel relative to said base, wherein said adjusting system comprises:
        a latch having an engaged position that prevents movement of said panel relative to said base and a disengaged position that enables movement of said panel relative to said base;
        a cable connected to said latch; and
        a handle connected to said cable such that actuation of said handle applies tension to said cable so as to move said latch from the engaged position to the disengaged position.

8. The portable computer docking station of claim 7 further comprising a spring that urges said latch to the engaged position.

9. A portable computer docking station comprising:
    a panel comprising a front surface, a back surface, and a lower edge;
    a hinge connected to the lower edge of said panel;
    a base connected to said hinge so that the back surface faces said base, wherein said base is disposed at an angle to said panel;
    an adjusting system interfaced with said hinge, wherein said adjusting system varies the angle between said base and said panel; and
    an interface assembly removably attached to the front surface of said panel, wherein said interface assembly is operable to releasably connect to a portable computer.

10. The portable computer docking station of claim 9 wherein said hinge comprises:
    outer hinge mounts disposed on said base; and
    a shaft comprising ends retained by said outer hinge mounts.

11. The portable computer docking station of claim 9 wherein the said panel can be disposed at an angle to said base between substantially 0° and 45° or more.

12. The portable computer docking station of claim 9 wherein said adjusting system is constructed so as to enable one-handed operation.

13. A portable computer docking station comprising:
a panel comprising a front surface, a back surface, and a lower edge;
a hinge connected to the lower edge of said panel;
a base connected to said hinge, wherein said base is disposed at an angle to said panel;
an adjusting system interfaced with said hinge, wherein said adjusting system varies the angle between said base and said panel; and
an interface assembly removably attached to the front surface of said panel, wherein said interface assembly is operable to releasably connect to a portable computer, wherein said adjusting system comprises:
a latch attached to said panel, wherein said latch has a first position engaged with said shaft and a second position disengaged from said shaft; and
a handle that moves said latch from the first position to the second position, wherein the first position prevents movement of said panel relative to said base.

14. The portable computer docking station of claim 13 further comprising a cable connected to said handle to said latch.

15. The portable computer docking station of claim 13 further comprising a spring that urges said latch to the first position.

16. A method comprising:
mounting an interface assembly to a front surface of a panel that is movably connected to a base by a hinge so that a back surface of the panel faces the base, wherein the panel is disposed at an angle to the base and the interface assembly is operably to releasably connect to a portable computer system; and
using an adjusting system to change the angle between the panel and the base and maintain the angle between the panel and the base, wherein the adjusting system comprises:
a latch having a first position that fixes the position of the panel relative to the base and a second position that enables movement of the panel relative to the base; and
a handle that moves the latch from the first position to the second position.

17. The method of claim 16 wherein the latch is moved from the first position to the second position by actuating a handle.

18. The method of claim 16 the latch is moved from the second position to the first position when the handle is released.

19. The method of claim 16 further comprising coupling a portable computer to the interface assembly, wherein the interface assembly provides an electrical connection between the portable computer and peripheral equipment communicatively connected to the interface assembly.

20. A portable computer docking station comprising:
means for removably attaching an interface assembly to a front surface of a panel;
means for releasably connecting a portable computer to the interface assembly;
means for supporting the panel at an angle to a base, wherein a back surface of the panel faces the base;
means for adjusting the angle between the panel and the base;
means for biasing a tooth surface against a corresponding locking surface to prevent movement of the panel relative to the base.

21. The portable computer docking station of claim 20, wherein the means for supporting the panel supports a portable computer coupled to the interface assembly.

22. The portable computer docking station of claim 20 wherein said means for adjusting the angle can be operated with a single hand.

* * * * *

UNITED STATES PATENT AND TRADEMARK OFFICE
CERTIFICATE OF CORRECTION

PATENT NO.       : 7,298,613 B2                                Page 1 of 1
APPLICATION NO.  : 10/948447
DATED            : November 20, 2007
INVENTOR(S)      : Memphis-Zhihong Yin et al.

It is certified that error appears in the above-identified patent and that said Letters Patent is hereby corrected as shown below:

In column 6, line 30, in Claim 20, after "base;" insert -- and --.

Signed and Sealed this

First Day of July, 2008

JON W. DUDAS
*Director of the United States Patent and Trademark Office*